United States Patent [19]
Wolcott et al.

[11] Patent Number: 6,002,360
[45] Date of Patent: *Dec. 14, 1999

[54] MICROSATELLITE ARRAY AND RELATED METHOD

[75] Inventors: James L. Wolcott, La Mirada; Atul Shah, Gardena; Christopher T. Evans, Orange, all of Calif.

[73] Assignee: TRW Inc., Redondo Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,127

[22] Filed: Mar. 7, 1997

[51] Int. Cl.$^6$ .............................. H04B 7/185; H01Q 3/22
[52] U.S. Cl. .......................... 342/354; 342/372; 455/13.1
[58] Field of Search ................................. 342/352, 353, 342/354, 368, 371, 372, 375; 455/12.1, 13.1, 13.2

[56] References Cited

U.S. PATENT DOCUMENTS

| | | | |
|---|---|---|---|
| H1383 | 12/1994 | Kaplan et al. | 342/372 |
| 4,375,697 | 3/1983 | Visher | 455/13.3 |
| 4,843,397 | 6/1989 | Galati et al. | 342/354 |
| 5,157,404 | 10/1992 | Rowe et al. | 342/372 |
| 5,504,493 | 4/1996 | Hirshfield | 342/372 |

*Primary Examiner*—Gregory C. Issing
*Attorney, Agent, or Firm*—Michael S. Yatsko

[57] ABSTRACT

A communication relay having a large number of free-flying, self-powered miniature spacecraft (10M) that cooperate to form a large antenna array with sufficient aperture and gain to focus transmit and receive beams much more accurately than in conventional satellite communication relays. The miniature spacecraft, or microsatellites, fly in a single constellation (10) but are allowed to drift in relative position because no rigid structure is provided to restrain their relative movement. Operation as a large phased-array antenna system is achieved by providing for accurate measurements of the microsatellite positions in real time. In one disclosed form of the array, a control satellite (20) conditions the microsatellites (10M) to form receive and transmit beams in desired directions. Received uplink signals are transmitted over communication crosslinks (42) to the control satellite (20), which forwards signals back to the microsatellites after conditioning them to form a transmit beam when forwarding the signals on as a downlink, transmission. A constellation (10) of microsatellites of the type disclosed may also be used as a deep-space communication relay, or as a radio-telescope.

6 Claims, 7 Drawing Sheets

MICROSATELLITE ARRAY AND RELATED METHOD

BACKGROUND OF THE INVENTION

This invention relates generally to communication in space and, more particularly, to communication systems using orbiting satellites to receive or transmit communication signals. Although there are a number of applications of the present invention, it will be best understood in the context of a space-borne communications relay linking a potentially large number of terrestrial terminals. Typically, such a relay includes an orbiting satellite with a large antenna system that can be physically or electronically directed toward selected terminals on the earth's surface. A communication from one terminal to another is directed up to the relay, which retransmits the communication toward the intended receiving terminal.

The antennas on communications relays are generally not large enough to direct transmissions to small regions of the earth's surface, or to communicate with transceivers of very low power. Typically, a relay antenna provides global coverage of practically the entire surface as viewed from the relay, and transceivers of moderate to high power must be used. Each transmission has to be allocated a separate frequency band to avoid interference between transmissions on overlapping frequency bands. The capacity of communication systems of this type would be greatly increased if larger antennas could be employed, because the theoretical gain of an antenna, and its ability to form a less divergent beam, increases as the square of the antenna diameter. Unfortunately, the mass of a required antenna supporting structure also increases roughly as the square of the diameter. An antenna system of large mass burdens the launch vehicle needed to place the relay in orbit, and adds to the difficulty of controlling the relay once in orbit.

The performance of a large space-borne antenna is limited not only by the overall physical dimensions, but also by the ability to precisely control the locations of physical features of the antenna, such as reflector surfaces and feed elements. Larger antennas are more difficult to control and are more likely to have imperfections in their surface geometry. Any attempt to overcome these difficulties usually results in adding even more mass to the overall structure.

There is, therefore, a significant need for a communications relay that overcomes these problems and provides an antenna system having a large diameter and high gain, but without the usual penalty of increased mass. If a suitably large diameter and high antenna gain can be provided, the communication system can be designed around a frequency plan in which frequency bands are reused in transmissions that are angularly separated from each other. The resultant communication system would, therefore, be able to handle much larger volumes of message traffic within a given overall frequency allocation. In addition, a high antenna gain would permit the use of very small, low-power transceivers on the ground. The present invention achieves these and other objectives, as will become apparent from the following summary and more detailed description.

SUMMARY OF THE INVENTION

The present invention resides in a space-borne communications relay system in which antenna gain and aperture size have no significant effect on overall launch mass. Basically, and in general terms, the invention comprises a plurality of free-flying, self-powered, cooperating transponders launched into adjacent orbits such that they move together in a constellation that functions as a very large collective antenna array; and a command spacecraft for controlling the transponders to function as a very large phased array antenna capable of receiving and transmitting signals over directionally controlled receive and transmit beams. More specifically, each transponder includes a receive signal delay circuit and a transmit signal delay circuit; and the command spacecraft includes means for controlling the receive signal delay circuit and the transmit signal delay circuit in each transponder to control the direction of the receive and transmit beams independently. An uplink signal received over the receive beam is retransmitted as a downlink signal to a different location over the transmit beam. A signal carrier frequency can be reused in different locations because the receive and transmit beams are sufficiently narrow to allow separation of signals of the same frequency transmitted from different locations. In the preferred embodiment of the invention, the command spacecraft is located within the transponder constellation; and the system further includes a plurality of communication crosslinks between the command spacecraft and the transponders for transmission of command signals as well as the downlink and uplink signals.

The invention may also be defined as a microsatellite communication relay system, comprising a plurality of free-flying, self-powered, cooperating transponders launched into adjacent orbits such that they move together in a constellation that functions as a very large collective antenna array; at least one focal station located among the cooperating transponders; and a plurality of communication crosslinks between the cooperating transponders and the focal station, to carry to the focal station delayed uplink signals received from a user by the transponders, and to carry signals from the focal station to the transponders, including downlink signals for delayed transmission to another user. The focal station includes means for determining the locations of the transponders, and means for forming receive beams and transmit beams by commanding each of the transponders to delay retransmission of signals by a preselected time. In this manner, the transponders are conditioned to function as a large phased-array antenna, to receive and transmit signals over the receive beams and transmit beams.

The microsatellite communication relay system of the invention may further include at least one maneuverable satellite located near an edge of the constellation of transponders, and having the capability of detecting when a transponder drifts too far from the constellation, and applying a correction acceleration to the transponder.

In accordance with another aspect of the invention, each of the transponders has multiple facets with antennas; and the focal station transmits antenna selection commands to the transponders. The communication crosslinks may be either radio-frequency crosslinks or may include fiber-optic connections between the focal station and the transponders.

In accordance with another aspect of the invention, its novelty resides in a method for communicating from one transceiver to another using a satellite communication relay, the method comprising the steps of conditioning a large number of free-flying, cooperative transponders to function as a phased-array antenna with a receive beam directed toward a transceiver that is ready to transmit an uplink signal, wherein the transponders are moving in adjacent orbits as a single constellation of satellites; transmitting the uplink signal from the transceiver to the transponders; receiving the uplink signal at the transponders; conditioning the transponders to function as a phased array antenna with a transmit beam directed toward a destination transceiver; and transmitting a downlink signal from the transponders to the destination transceiver. The transponders are sufficiently numerous and widely spaced to provide a large antenna aperture and relatively narrow receive and transmit beams that permit reuse of transceiver frequencies in different locations.

More specifically, the steps of conditioning the transponders includes determining the locations of the individual transponders; and interposing a selected time delay for uplink signals received at each transponder and for downlink signals transmitted from each transponder. The time delays are computed using phased-array antenna principles and based on the locations of the transponders and the intended directions of the receive and transmit beams. The method may further include the steps of transmitting the delayed uplink signals over communication crosslinks from the transponders to a focal station orbiting with the transponders; receiving multiple, coherently combined uplink signals at the focal station; demodulating the received uplink signals at the focal station; and identifying the destination transceiver from the demodulated uplink signals. The conditioning steps are effected by transmitting control signals from the focal station to the transponders over the communication links.

In accordance with yet another aspect of the invention the method further includes detecting the orientation of each transponder; and transmitting antenna selection signals to each transponder from the focal station, to provide for maximum transponder antenna gain for the uplink and downlink signals, and for signals transmitted and received over the communication crosslinks.

In the method of the invention, the step of determining the locations of the transponders is performed at least in part by at least one "fencepost" station located near an edge of the constellation. The method may further include a step of applying a corrective force to any transponder whose position has strayed beyond a predefined constellation boundary.

It will be appreciated from the foregoing that the present invention satisfies a long felt need for a space-borne communications relay having an antenna system with a large aperture and gain, but without the usual penalty of correspondingly large mass. The invention provides a revolutionary solution to this antenna scaling problem by utilizing hundreds or thousands of independently orbiting satellites that cooperate to provide a phased-array antenna of extremely large aperture and beams narrow enough to allow frequency reuse over relatively small regions of the earth's surface and to permit the use of very small, low-power transceivers. Other aspects of the invention will become apparent from the following more detailed description, taken in conjunction with the accompanying drawings.

BRIEF DESCRIPTION OF THE DRAWINGS

PIG. 7 is a flowchart depicting the functions performed by a digital signal processor in the focal station shown in FIG. 6.

DESCRIPTION OF THE PREFERRED EMBODIMENTS

As shown in the drawings for purposes of illustration, the present invention pertains to a satellite communications relay system providing a very large antenna aperture and gain, but without any significant mass penalty. Conventional space-borne antenna systems cannot be made very large without drastically increasing the launch mass of the antenna system and its supporting structure. Consequently, conventional space-borne antenna systems are not large enough to focus beams accurately on selected regions of the earth's surface. Instead they cover large areas of the earth, placing a huge demand on frequency bandwidth.

Figure 1:
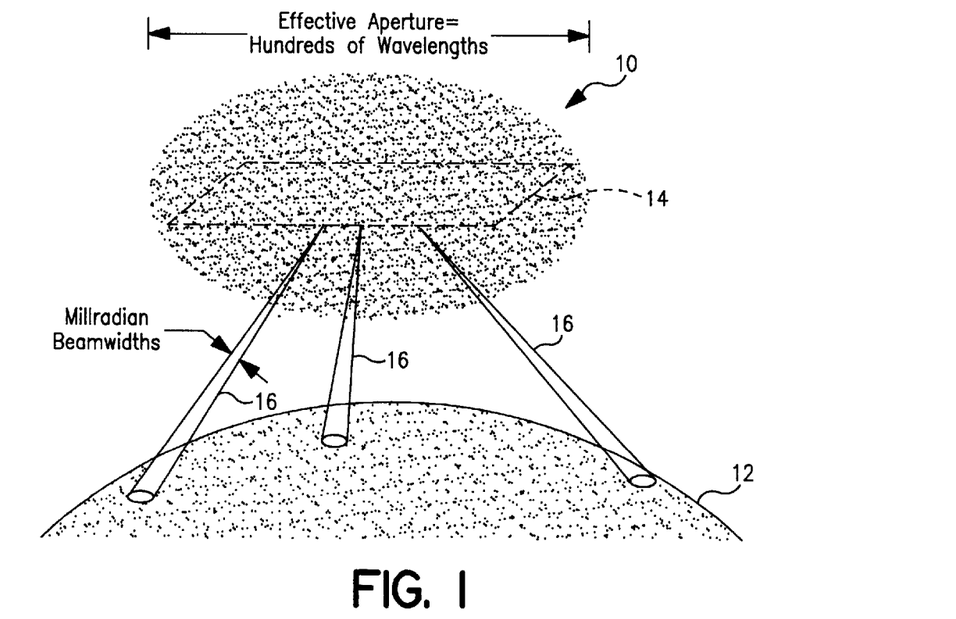
FIG. 1 is a diagrammatic view illustrating the transponder cloud concept of the invention.

In accordance with the present invention, a space-borne antenna system comprises a large number of free-flying, self-powered, cooperating satellites, which together form a very large phased-array antenna. The concept is illustrated in FIG. 1, which shows a "cloud" 10 of microsatellites, each of which is depicted as a small black dot. The cloud 10 is placed in orbit about the earth 12 and has an effective aperture, shown as a rectangle 14 in broken lines, that may be hundreds of times the wavelength used for communicating to or from the antenna. For communications in the UHF (ultra-high-frequency) band, with wavelengths up to one meter, the effective aperture may be, for example, 100 meters or more. With an aperture this large, the cloud 10 can be electronically controlled as a phased-array antenna, to produce beamwidths measured in milliradians, as shown by beams 16.

The individual microsatellites, referred to by reference numeral 10M, require no maneuvering or attitude control capability and are extremely small compared to conventional satellites, only a few centimeters in diameter and with a mass of only about 20–25 grams. The microsatellites 10M in the preferred embodiment of the invention are interconnected only by RF or optical crosslinks, without any physical support structure.

Figure 2:
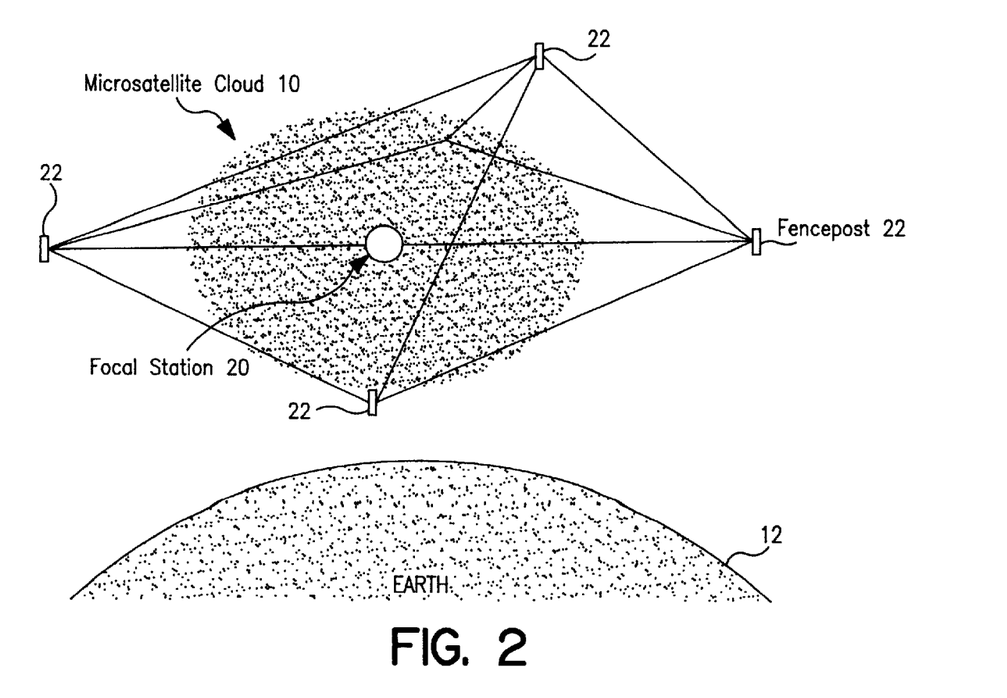
FIG. 2 is a view similar to FIG. 1, but also showing a focal station and multiple "fencepost" stations as part of the transponder cloud.

FIG. 2 depicts one space-borne configuration using the microsatellite cloud 10. The configuration includes three types of spacecraft: a large number of microsatellites indicated by the cloud 10, a focal station 20 located near the center of the cloud, to perform complex centralized processing tasks, and a number of additional satellites referred to as "fenceposts" 22. The fenceposts 22 have maneuvering capability, stationing themselves at the outer edges of the array or cloud 10, and readjusting the orbits of wayward microsatellites as needed. The fenceposts 22 support the focal station 20 in accurately locating each of the microsatellites continuously and in real time. The fenceposts 22 also act as reference beacons, helping the microsatellites determine their orientation without the need for complex onboard sensor systems.

Before turning to a more detailed description of the microsatellites and how they are controlled, it would probably be helpful to consider the steps that are performed in relaying a communication signal from one terrestrial user to another using the satellite relay in accordance with the invention. The steps involved include the following:

The focal station 20 periodically updates the positions of the microsatellites using interferometry or laser ranging data forwarded from fenceposts 22. The focal station 20 and the fenceposts 22 are provided with ephemeris data defining their position relative to the earth. Therefore, the position of each microsatellite can be determined relative to earth or some other frame of reference.

The focal station 20 sends a unique receiver delay command to each microsatellite, based on the desired beam direction and the relative locations of each of the microsatellites.

A user starts transmitting from within the "footprint" of the currently formed beam formed by the cloud 10.

As the user signal reaches each microsatellite, it is delayed by a preselected amount, consistent with the commands previously issued by the focal station.

After the commanded delay, each microsatellite retransmits the user signal to the focal station 20 via a crosslink.

As all of the microsatellite signals arrive at the focal station 20, they combine coherently to promote the extraction of the uplinked communication signal from composite noise that is present. The received signal is then demodulated. Any signal having an overlapping frequency band, but emanating from a region outside the footprint of the currently formed beam, is ignored because the beam is narrow enough to discriminate between sources from different directions.

The focal station 20 determines the destination of the user signal based on header information in the message, and sends unique delays to each of the microsatellites to form a transmit beam in the desired direction of the intended destination.

The message is broadcast by crosslinks from the focal station 20 to all of the microsatellites.

After the commanded delay, the signal is retransmitted by each microsatellite. The retransmitted signals combine in the far field of the array formed by the microsatellites, and form a maximum lobe in the direction of the intended destination terminal.

The signal arrives at the destination terminal at high received isotropic power, and is demodulated.

Figure 3:
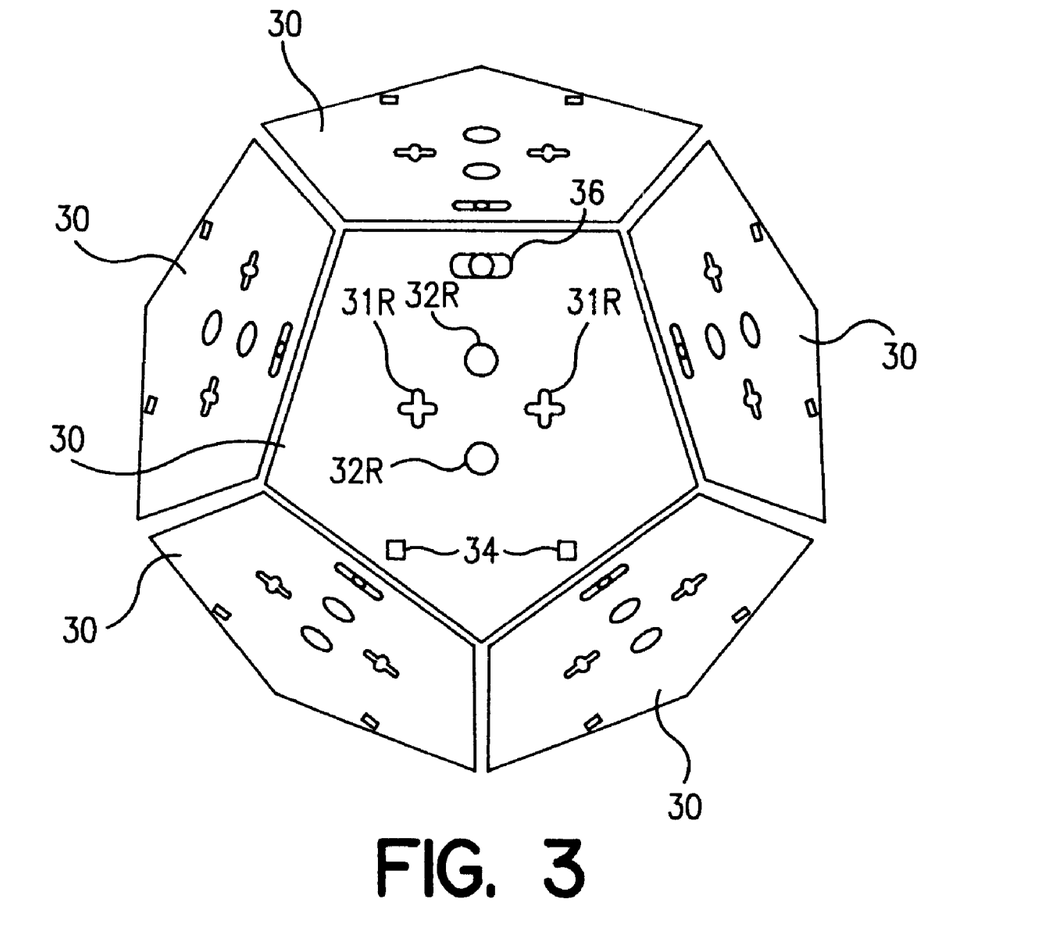
FIG. 3 is an elevational view of a microsatellite transponder suitable for use in the present invention.

FIG. 3 is an exterior view taken normal to one face of an illustrative microsatellite 10M in accordance with the present invention. In this embodiment, the microsatellite 10M is a regular dodecahedron with twelve identical, planar facets 30, six of which are visible in the figure. Each facet 30 takes the form of a regular pentagon, and each edge of the facet forms a common boundary with an adjacent facet. Other configurations could be used, but this one has some useful advantages. The planar surfaces facilitate fabrication of various electronic components, including solar cells, transceivers, photodetectors, and so forth. Also, the structure has a useful symmetry. Opposing facets 30 are parallel with each other and, since there are twelve identical facets, the structure's orientation is not critical. Slot antennas 31R and 31T are provided for communication with the focal station 20. User link antennas, indicated at 32, are fractional wavelength toploaded dipoles connected between opposing facets 30, with one dipole 32R for receive signals and the second dipole 32T for transmit signals. A commutation scheme is used to engage only the best-oriented pair of dipoles at any instant, based on which facet is pointing "down" toward the earth. The "up/down" and "east/west" orientation of the structure, as well as its position in space, is determined by photodetectors 34 on each facet 30, which respond to laser ranging beams transmitted by fencepost satellites 22 (FIG. 2). Batteries and radiation-sensitive electronics can be located in the interior of the microsatellite.

Also included on each facet 30 is a shuttered retroreflector 36, which modulates and reflects an optical beam transmitted from one or more of the fenceposts 22. The modulation imposed on the reflected beam uniquely identifies the microsatellite 10M to the fenceposts and the focal station.

The surface of each facet 30 provides additional functionality not specifically illustrated, including a solar cell array, electrochromic film surfaces for active thermal control and, possibly, supporting electronics. The design of the identical facets 30 lends itself to wafer-scale fabrication using known semiconductor fabrication techniques.

Each microsatellite has sufficient area to receive approximately 3 watts of solar power when in orbit. With a conversion efficiency of approximately 15%, each microsatellite has sufficient power to operate a transmitter at a few tenths of a milliwatt. Although the elemental power of each microsatellite is relatively low, the total transmitting power or the antenna system is large because there are hundreds or thousands of microsatellites in the cloud 10.

Figure 4:
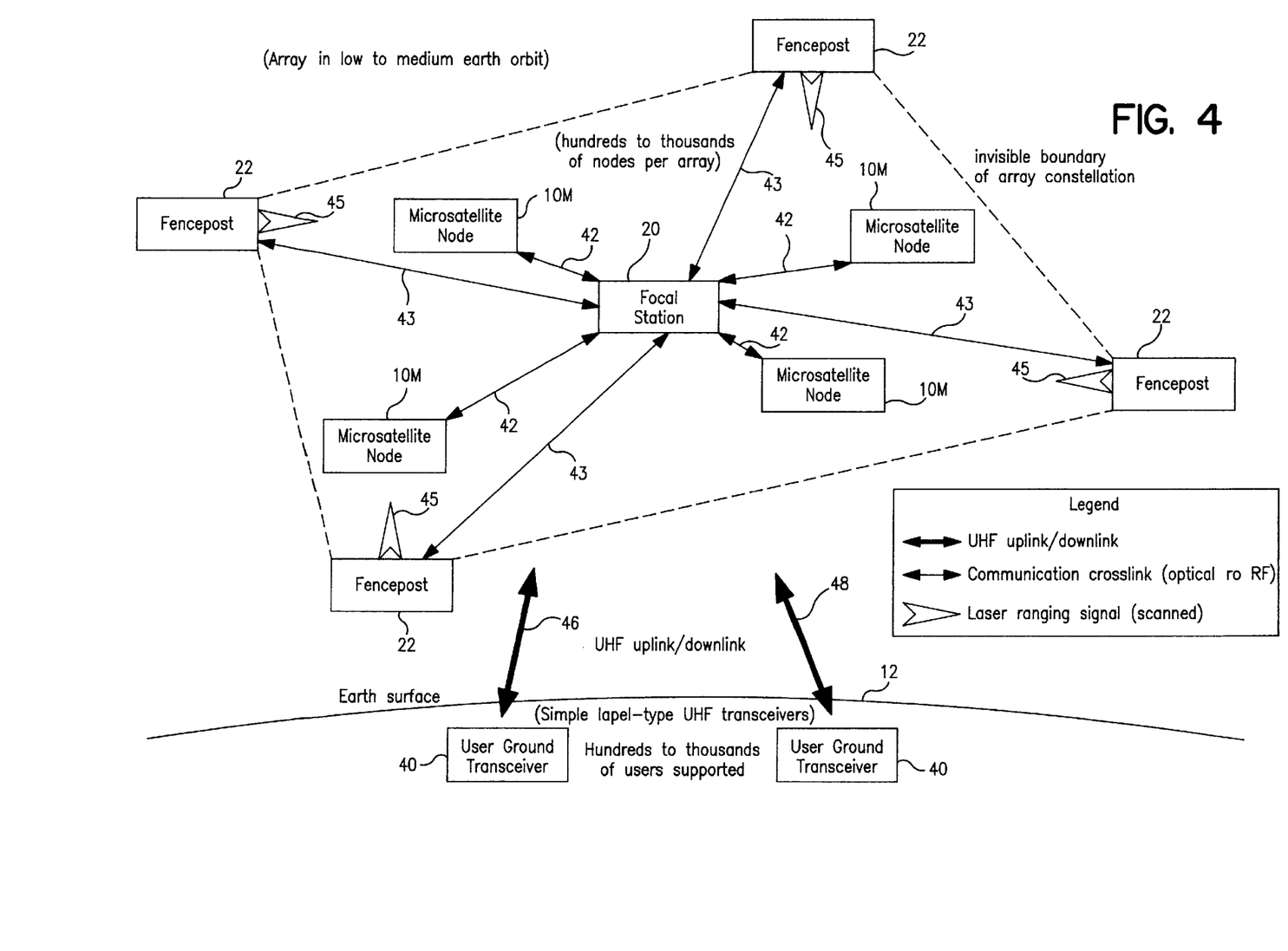
FIG. 4 is a block diagram of a microsatellite constellation shown in relation to two ground-based transceivers.

FIG. 4 is a microsatellite array constellation block diagram, showing the interrelationships of the microsatellites 10M, the focal station 20, optional fencepost satellites 22, and user ground transceivers 40 located on the earth's surface. As indicated, the focal station 20 communicates with each of the microsatellites 10M by crosslinks 42, and communicates with each of the fenceposts 22 by crosslinks 43. It will be understood, however, that in some configurations there may be crosslink communication between microsatellites, and that the central control functions of the focal station 20 may be distributed, in part, among multiple microsatellites 10M. The fencepost satellites 22 maintain an invisible boundary, indicated by the dotted lines 44, within which the microsatellites 10M are contained. Each fencepost satellite 22 has maneuvering capability and senses when satellites cross the boundaries 44. Each fencepost 22 emits a scanned laser ranging beam, indicated 45, to sense the positions and orientations of the individual microsatellites 10M.

The user ground transceivers 40 may be of a type having extremely low transmitting power, such as lapel-type devices weighing only a few grams. The microsatellite cloud 10 will, however, provide a large antenna gain, to receive signals from the ground transceivers 40 over an uplink path 46 with a large signal-to-noise ratio and to transmit signals to ground transceivers over a downlink path 48. The ability of the cloud 10 to form very narrow antenna beams permit transceiver frequencies to be reused over different regions of the earth's surface.

Figure 5:
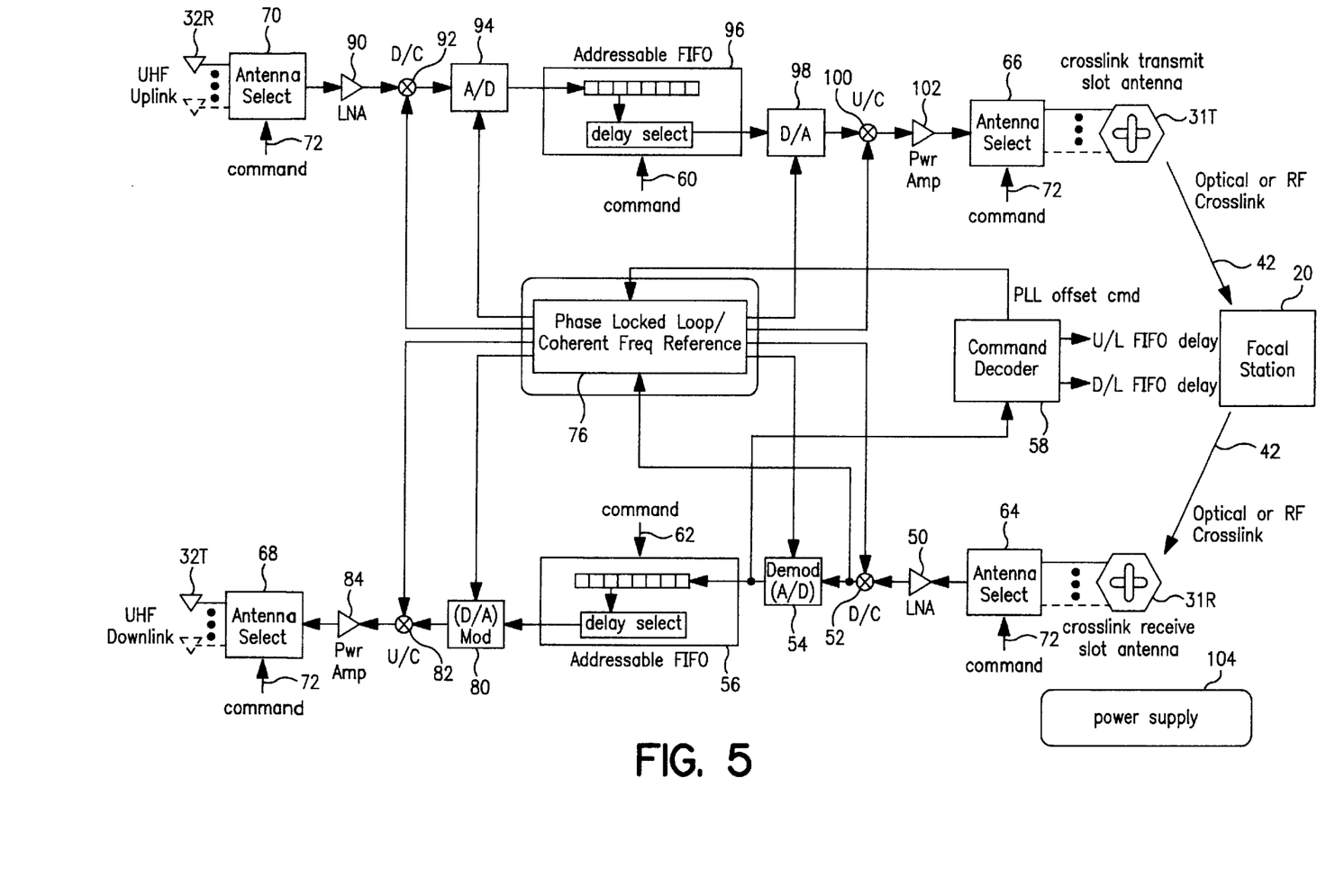
FIG. 5 is a block diagram of a single microsatellite transponder.

FIG. 5 is block diagram of one of the microsatellites 10M. The microsatellite receives signals from the focal station 20 over a crosslink 42. These signals may be command signals that set receive and transmit delays, or select antennas, or may be data signals intended to be relayed to a UHF user downlink 48. The microsatellite also receives data signals from a UHF user uplink 46 and relays these signals to the focal station 20 via one of the crosslinks 42. These functions will now be described in more detail.

Signals received from the focal station 20 are amplified in a low-noise amplifier 50, down-converted in frequency by a downconverter 52, and demodulated in a demodulator 54. Although not shown separately in the diagram, before further processing the signals are at this point converted from analog to digital form. Since the received signals may contain both commands and message data, they are shown as taking two paths: to a time delay circuit 56 and to a command decoder 58. The command decoder 58 determines from the received data content whether commands are being received and decodes the commands that are intended for this particular microsatellite. Commands are distinguished by a unique message header preceding the message data and are addressed to individual microsatellites. The commands can be of three types: uplink and downlink delay commands, antenna selection commands, and phase-locked loop offset commands. The uplink and downlink delay commands are indicated as being applied through lines 60 and 62, respectively. The antenna switching commands are applied to antenna switching circuits 64, 66, 68 and 70, as indicated at 72. The phase-locked loop offset command is applied over line 74 to a phase-locked loop coherent frequency reference 76. The latter is a local frequency reference generator that supplies reference frequency signals needed for frequency down-conversion, frequency up-conversion, modulation and demodulation, all in accordance with conventional communication principles.

In one embodiment of the invention, the antenna switching commands applied over lines 72 are generated internal to each microsatellite, to reduce the processing load on the focal station 20. For this purpose, each microsatellite must include some means for sensing its own attitude with respect to a frame of reference. One technique is to employ optical detectors on each microsatellite to detect optical beams transmitted by the fenceposts 22, and to determine from the sensed directions of the fenceposts which is the best antenna to use for transmission to the focal station, and which is the best antenna to use for uplink and downlink signals. Since the microsatellites are free-flying and use no attitude control, the antenna selection process is performed continually.

Demodulated data signals received from the focal station 20 are input to the delay circuit 56, which is an addressable first-in-first-out (FIFO) shift register. The command on line 62 determines how long the data spends in the time delay circuit 56, before being forwarded to a conventional modulator 80, frequency up-converter 82, and power amplifier 84. Prior to modulation, the digital signals output from the delay circuit 56 are converted back to analog form. After amplification in the power amplifier 84, the data signals are transmitted through the UHF downlink antenna 32T, which is subject to selection (i.e., a particular facet dipole is selected) by the antenna selection circuit 68.

The uplink path is largely symmetrical with the downlink path just described. Data received on the uplink antenna 32R, which is selected by antenna selection circuit 70, is passed to a conventional amplifier 90, and then to a downconverter 92. Because the received uplink signals are relatively weak, demodulation is likely to yield unreliable data and is not performed. Moreover, there is no need to obtain the modulation data contained in the uplink signal at this stage. Therefore, instead of a demodulator, only an analog-to-digital converter 94 follows the downconverter 92. The digitized signals are then subject to a variable time delay in another addressable FIFO circuit 96, under command of a signal on line 60. The delayed signals are converted back to analog form in a digital-to-analog converter 98, frequency upconverted in upconverter 100, and amplified in power amplifier 102. The signals are then passed to transmit antenna 31T, selected by antenna selection circuit 66, and transmitted to the focal station 20 over crosslink 42.

Power for the components of the microsatellite is provided by conventional components, as indicated in block 104. These include solar cells built into the facets 30 of the spacecraft and a battery stowed inside the structure.

Figure 6:
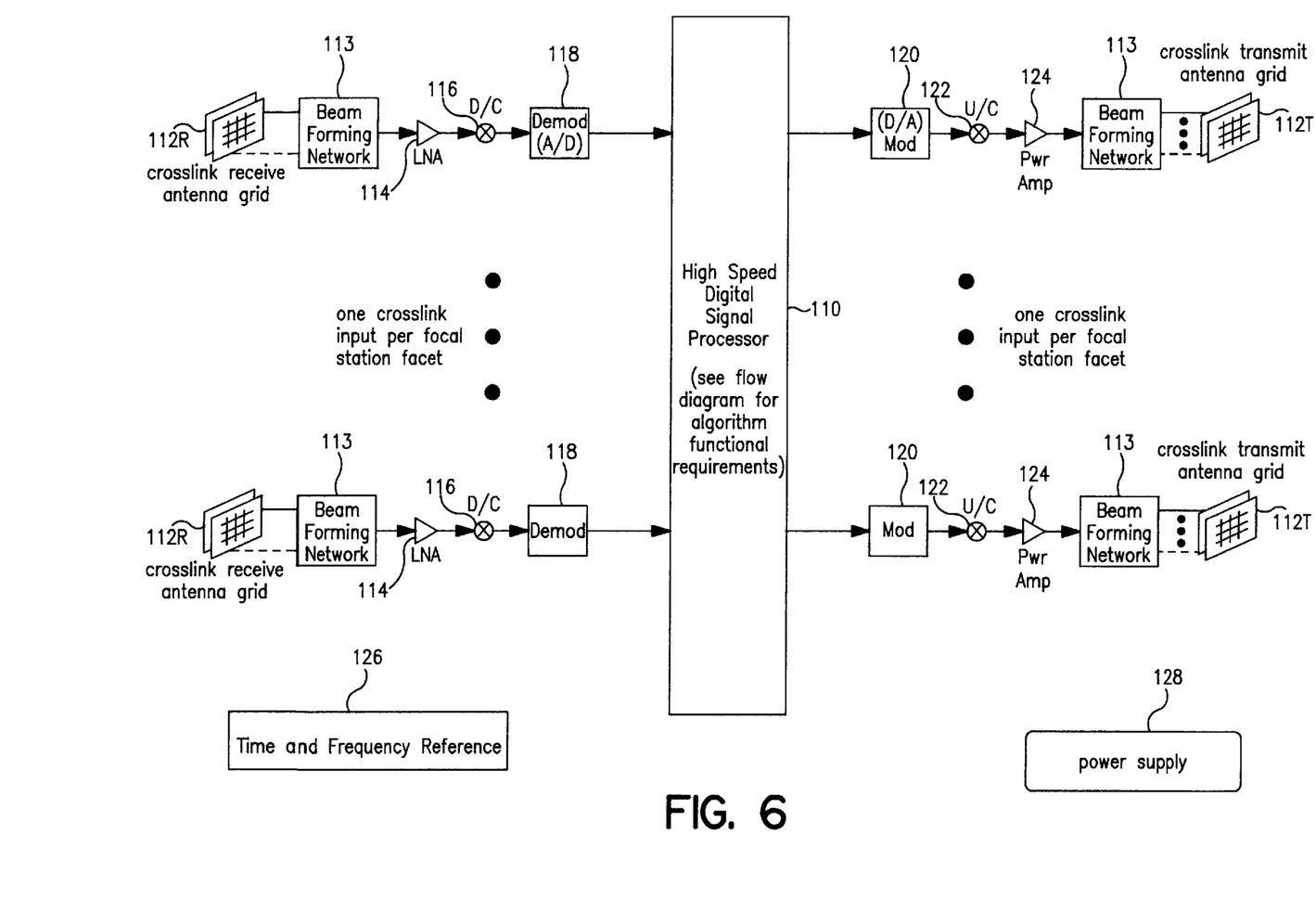
FIG. 6 is a block diagram of a focal station used in the present invention.

FIG. 6 shows diagrammatically how the focal station 20 operates in a communication mode. Central to the focal station is a high-speed digital signal processor 110. Although various configurations could be used for the focal station 20, it is assumed in this discussion that the focal station also has multiple facets similar to the microsatellites discussed above. For each such facet, there is a crosslink receive antenna grid 112R and a crosslink transmit antenna grid 112T, each of which is directionally controlled by a beam-forming network 113 Signals received over crosslinks 42 from multiple microsatellites 10M combine coherently at one or more of the antennas 112R and are processed by an amplifier 114, downconverter 116 and demodulator 118, before input to the signal processor 110. The signal processor 110 outputs data and control signals that are processed by a modulator 120, upconverter 122 and amplifier 124, before transmission from the crosslink antenna grid 112T. As in the microsatellite block diagram of FIG. 5, the demodulators 118 in the focal station include an analog-to-digital conversion, and the modulators 120 include a digital-to-analog conversion.

The signal processor 110 not only has to pass data back to the microsatellites, but has to generate control signals for each of the microsatellites, to adjust the transmit time delays consistent with the intended destination of the data, as determined from the message itself in the signal processor 110. Each microsatellite has a unique address or identification that must be associated with the transmitted control signals. As discussed with reference to FIG. 5, a command decoder on each microsatellite recognizes incoming control signals and determines whether or not they are intended for the specific microsatellite. The focal station 20 also includes a time and frequency reference source, as indicated in block 126 and a conventional power supply, as indicated in block 128.

Figure 7:
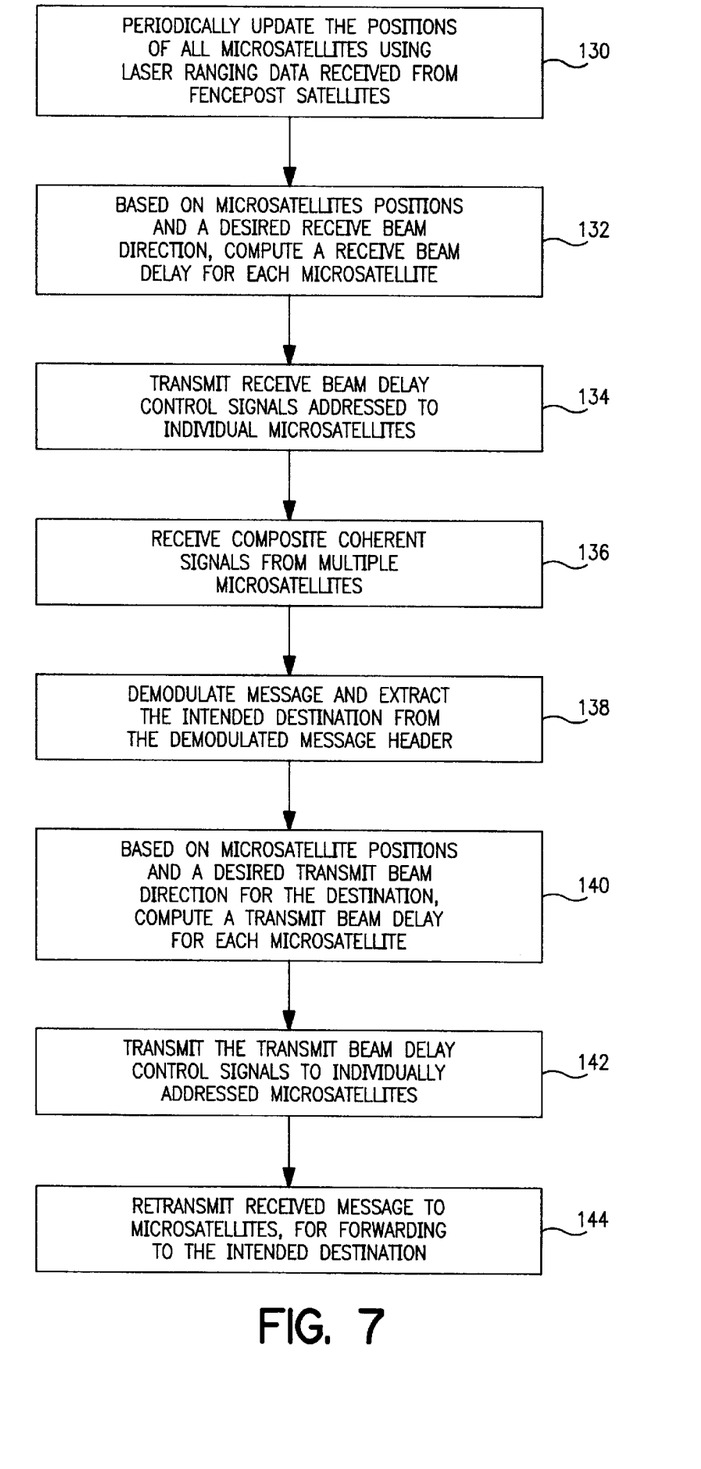

FIG. 7 is a flowchart showing the principal functions performed by the digital signal processor 110 in the focal station 20. As indicated in block 130, the digital signal processor 110 periodically receives data from the fenceposts 22 to update the positions of all of the microsatellites.

As indicated in block 132, based on the measured microsatellite positions and a desired receive beam direction, the digital signal processor 110 next computes a receive or uplink beam delay for each microsatellite, using well known principles of phased-array antennas. Because of the large size of the microsatellite configuration, the receive beam is highly focused to a beam width measured in microradians. The receive beam delays are transmitted to the individual microsatellites, as indicated in block 134. If RF crosslinks, or free-space optical crosslinks, are used for this purpose, each command must contain an associated microsatellite address, which can be detected by the microsatellites. If the crosslinks are individual optical fibers, addresses need not be transmitted if each fiber connects to only one microsatellite.

After the microsatellites have implemented the commanded delays and have received an uplinked message and transmitted it to the focal station 20, the message arrives at one or more of the crosslink receive antennas 112R, as indicated in block 136. If the receive beam delays have been properly computed and implemented, the message will arrive from many of the microsatellites in coherent form. That is to say, the signal contributions from the individual microsatellites will combine coherently to form a composite signal with a large signal-to-noise ratio. Probably not all of the microsatellites will be able to transmit to a single antenna 112R on one facet of the focal station 20. The signals received on multiple antennas 112R may be combined in the digital signal processor 110.

Under control of the digital signal processor 110, the demodulated message is examined to determine its destination on the ground, as indicated in block 138. The digital signal processor 110, maintains a database of the locations of active transceivers, and determines from the encoded destination a direction for a transmit beam. The digital signal processor 110 next computes the individual delays needed to form the transmit beam in the desired direction, based on the measured positions of the microsatellites, as indicated in block 140. The delays are transmitted to the microsatellites in the form of commands, as indicated in block 142. Finally, the message is transmitted to the microsatellites, as indicated in block 144, for forwarding to the intended destination over the transmit beam.

An additional control step not shown in FIG. 7 is the transmission of antenna selection signals to the microsatellites. Based on the reflected optical beam returned to the focal station 20 when measuring the microsatellite positions, the digital signal processor 110 has detects which facet of each microsatellite is currently facing the focal station, and generates a command signal to make sure that the appropriate antenna is selected in the microsatellite. Since the digital signal processor 110 also knows the direction of the receive and transmit beams, antenna selection signals can also be generated to select an appropriate antenna for uplink and downlink signals handled by each microsatellite.

Figure 8:
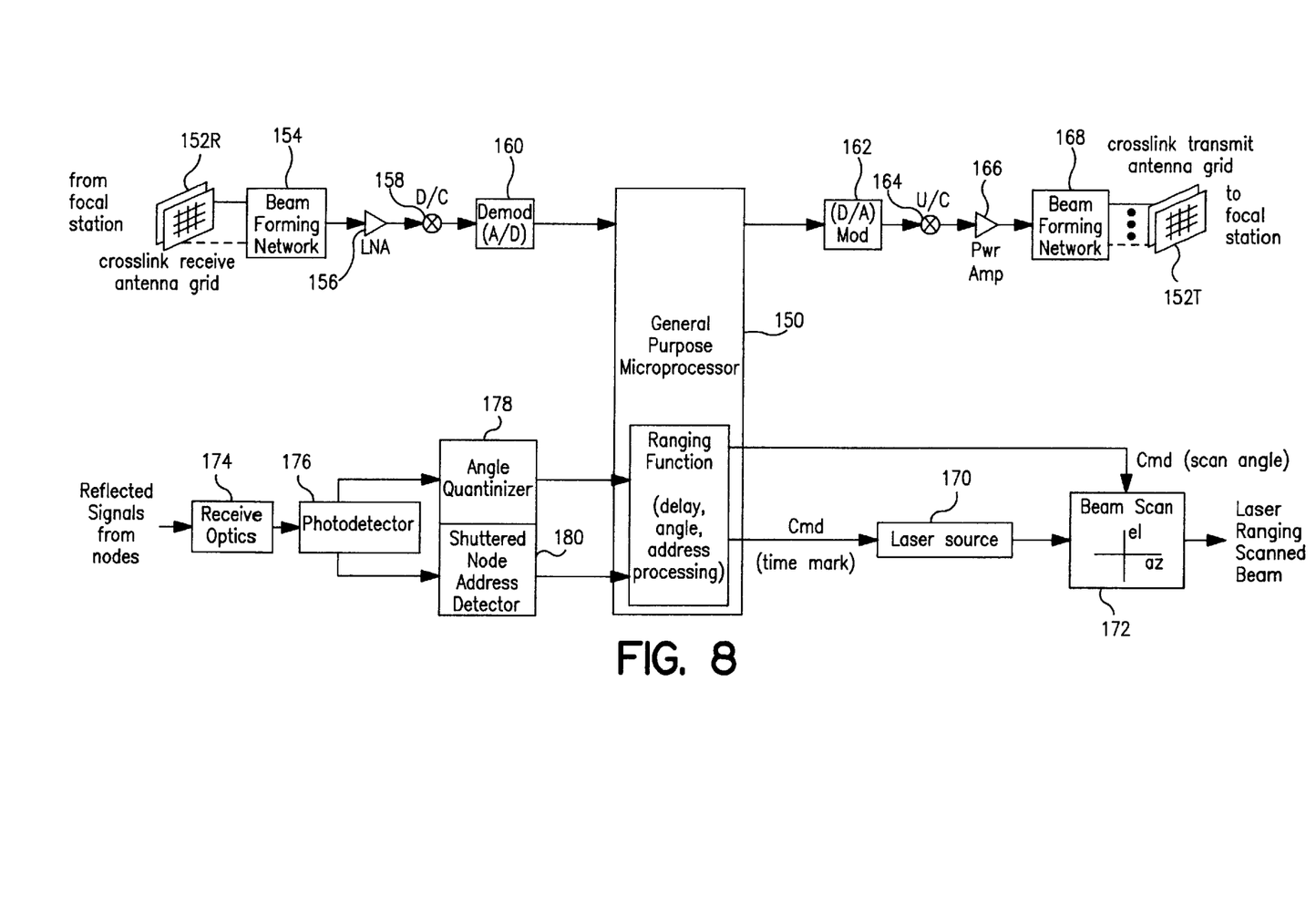
FIG. 8 is a block diagram of a fencepost station used in the present invention.

FIG. 8 is a block diagram showing two principal functions of a fencepost 22: communication with the focal station 20 and microsatellite position detection. A third function has been briefly discussed, namely applying course corrections to individual microsatellites to keep them within a designated constellation boundary.

Each fencepost 22 is controlled by a general purpose microprocessor 150. Receive and transmit communication with the focal station 20 is maintained using the components shown in the upper part of the figure. Specifically, a receive crosslink from the focal station 20 includes a crosslink receive antenna grid 152R and associated beamforming network 154, signals from which are processed by a low-noise amplifier 156, a downconverter 158 and a demodulator 160, which includes an analog-to-digital converter (not separately shown). The received, demodulated and digitized signals are then input to the microprocessor 150. A transmit crosslink to the focal station 20 includes a modulator 162 (with digital-to-analog conversion) an upconverter 164, and power amplifier 166. The resulting signals are passed through a beamforming network 168 to a crosslink transmit antenna grid 152T.

The fencepost 22 also includes a laser 170 source and a beam scanner 172, both of which are controlled by the a ranging function 174 or the microprocessor 150. In laser ranging, the laser beam is scanned through a complete range of elevation and azimuth angles. As the beam impinges on a shuttered retroreflector 36 of a microsatellite 10M, the beam is reflected back to the fencepost 22 with a unique modulation that identifies the microsatellite. The reflected optical beam passes through appropriate receive optics to a photodetector 176, the output of which is coupled to an angle quantizer 178 and to a shuttered node address detector 180. The angle quantizer 178 determines azimuth and elevation angles, using the commanded scan angles at the time of detection of the reflected beam. A fine range is determined from the elapsed time between the emission of a beam time mark, which may be any form of modulation to the laser beam emitted from the laser source 170, and detection of the time mark in the reflected pulse, by the photodetector 176. The shuttered node address detector decodes the modulation impressed on the beam by the retroreflector 36 on a microsatellite. The corresponding elevation, azimuth and range readings can then be associated with a particular microsatellite, to define its position with respect to a fencepost frame of reference. Because the fencepost 22 also receives ephemeris data from the ground or from the focal station 20, the microprocessor 150 can also convert the microsatellite positions to any desired frame of reference.

The collected microsatellite position data are transmitted to the focal station 20 over the communication crosslink discussed above. The focal station 20 will, in many cases, receive redundant position data because many of the microsatellites will be visible from more than one fencepost 22. The focal station 20 polls the fenceposts for position data, over the communication crosslink, and preferably requests selected position data from individual fenceposts 22. The focal station 20, having accumulated position data for all of the microsatellites and fenceposts, can determine which fenceposts will provide the most reliable position updates for each microsatellite. For any situation in which redundant position data are received from multiple fenceposts 22, the focal station 20 must resolve any inconsistencies, such as by eliminating unreliable data or averaging multiple position solutions for the same microsatellite.

It will be understood that the crosslinks 42 between the focal station 20 and the microsatellites may not necessarily take the form of radio-frequency (RF) links or free-space optical links. In many respects, communication and control of the microsatellites would be facilitated if the crosslinks 42 took the form of individual optical fibers. To minimize possible physical problems that might result from having hundreds or thousands of optical fibers emanating from the focal station 20, an alternative approach would be to connect some of the microsatellites together by optical fibers and to use a smaller number crosslinks between microsatellites and the focal station. In any embodiment using optical fibers for crosslinking, the fibers perform the additional function of keeping the microsatellites tethered in a single constellation. One function of the fencepost satellites 22 would then be reduced or eliminated.

It will be understood that the invention may be implemented in slightly different forms than the one described here. For example, instead of employing a single centralized digital signal processor in the focal station, other configurations may distribute the control functions among several other stations, such as the fenceposts 22. It will also be understood that, although various RF components are disclosed as being conventional electronic devices, other technologies may be more appropriate in the space environment of the invention. For example, some of the component functions may be best implemented using photonics, i.e. optical processing components.

A key feature of the invention is that antenna element spacing is not controlled by any physical structure. Instead the antenna elements are permitted to move freely under gravitational effects in their closely related orbits. Although there will inevitably be a tendency of the microsatellites to drift in space relative to each other, operation of the antenna formed by the microsatellites is not dependent on maintaining their physical spacing. Instead the spacing of the microsatellites is periodically measured and taken into account when forming receive and transmit beams. Unlike conventional phased-array antennas, in which phase delay is controlled by fixed cable lengths and beamforming networks, the microsatellite array has phase delays that are adjusted in real time by a commanded delay interposed in each microsatellite transponder. Further, because the microsatellites are independently powered, and have omnidirectional antennas on multiple facets, there is no need to distribute power from a central source or to control the attitude of the transponders.

Although the invention has been described in the context of a satellite communications relay between terrestrial terminals, it also has other important applications. For example, a cloud of microsatellites could function as a deep-space relay for communication between planets, or between earth and distant spacecraft. Another useful application is in radio-astronomy. Terrestrial-based radio telescopes are necessarily dependent on the direction that they face as the earth rotates. A cloud of microsatellites may be designed to be three-dimensional, and therefore able to form a beam in almost any direction, providing a significant advantage over conventional radio-telescopes. The microsatellite array of the invention is also useful in anti-jamming or anti-interference applications, because the large array diameter permits the formation of extremely narrow transmit and receive beams.

It will, therefore, be understood that, although specific embodiments of the invention have described in detail for purposes of illustration, various modifications may be made without departing from the spirit and scope of the invention. Accordingly, the invention should not be limited except as by the appended claims.

We claim:

1. A method for communicating from one ground-based transceiver to another using a satellite communication relay operating at ultra-high frequencies, and wavelengths up to approximately one meter, the method comprising the steps of:

conditioning a large number of free-flying, structurally independent, cooperative transponders to function cooperatively as a single phased-array antenna with a receive beam directed toward a transceiver that is ready to transmit an uplink signal, wherein the transponders are moving in adjacent but independent orbits as a single constellation of satellites and each transponder has faces and multiple antennas installed in the multiple faces;

transmitting the uplink signal from the transceiver to all of the transponders acting in cooperation as a single phased-array antenna;

receiving the uplink signal at the transponders;

conditioning the transponders to function cooperatively as a single phased-array phased array antenna with a transmit beam directed toward a destination; and transmitting a downlink signal from the transponders acting in cooperation as a single phased-array antenna, to the destination transceiver;

wherein the receive beam and the transmit beam provide independent and simultaneous uplink and downlink paths;

wherein the transponders are sufficiently numerous and widely spaced to provide a large antenna aperture and relatively narrow receive and transmit beams that permit reuse of transceiver frequencies in different locations;

and wherein the steps of conditioning the transponders includes periodically determining the locations of the individual transponders by detecting their angular positions and ranges with respect to a number of special-purpose satellites in known orbits, interposing a selected time delay for uplink signals received at each transponder and for downlink signals transmitted from each transponder, wherein the time delays are computed using phased-array antenna principles and based on the locations of the transponders and the intended direction of the receive and transmit beams, detecting the orientation of each transponder, and applying antenna selection signals to each transponder, based on its detected orientation, to select the antennas in each transponder that provide for maximum transponder antenna gain for the uplink and downlink signals, and for signals transmitted and received over the communication crosslinks.

2. A method as defined in claim 1, and further comprising:

transmitting the delayed uplink signals over communication crosslinks from the transponders to a focal station orbiting with the transponders;

receiving multiple, coherently combined uplink signals at the focal station;

demodulating the received uplink signals at the focal station; and identifying the destination transceiver from the demodulated uplink signals;

wherein the conditioning steps are effected by transmitting control signals from the focal station to the transponders over the communication links.

3. A satellite communication relay system, comprising:

a plurality of self-powered, cooperating microsatellites launched into adjacent obits such that they move generally together in a constellation but are free-flying and structurally independent of each other, wherein each microsatellite has at least one elemental antenna and two signal delay circuits for processing signals received and transmitted, respectively, through the elemental antenna;

at least one command satellite launched into an orbit adjacent to the orbits of the microsatellites, for controlling the microsatellites to function in cooperation as a single very large phased array antenna, the command satellite including a control system operative to condition the microsatellites to function as a receiving phased-array antenna having a receive beam directed toward a ground-based transceiver capable of transmitting a communication message containing an intended destination code, and to condition the microsatellites to function simultaneously as a transmitting phased-array antenna having a transmit beam directed toward a second transceiver that is the intended destination of the communication message;

a plurality of communication crosslinks between the control satellite and the microsatellites, for transmission of signals to determine the locations of the microsatellites, for transmission of communication signals for use in the transmit beam and derived from the receive beam, and for transmission of control signals to select appropriate signal delays in the microsatellites, to effect steering of the transmit and receive beams; and a plurality of maneuverable satellites launched into orbits generally adjacent and parallel to those of the microsatellites, the maneuverable satellites providing optical beams that provide a frame of reference from which the microsatellites can determine their respective orientations, wherein the receive beam and the transmit beam provide independent and simultaneous uplink and downlink paths;

and wherein each microsatellite has multiple faces and multiple elemental antennas installed in the faces, and also includes an antenna switch operable based on microsatellite orientation determined from the frame of reference provided by the maneuverable satellites, the antenna switch being operable to select an optimum antenna for each of three functions of the microsatellite, including receiving a receive beam component, transmitting a transmit beam component and communicating over one of the communication crosslinks.

4. A satellite communication relay system as defined in claim 3, wherein the receive beam and the send beam are transmitted at ultra-high frequencies, with a wavelength as long as approximately one meter.

5. A satellite communication relay system as defined in claim 3, wherein:
microsatellite orientation is determined from the maneuverable satellites, which transmit antenna switching signals to the microsatellites based on orientation determination.

6. A satellite communication relay system as defined in claim 3, wherein:
microsatellite orientation is determined in each individual microsatellite and appropriate antenna switching signals are generated internally.

\* \* \* \* \*